United States Patent [19]

Witt

[11] Patent Number: 5,821,503
[45] Date of Patent: Oct. 13, 1998

[54] CONVEYOR SPEED CONTROL CIRUIT FOR A CONVEYOR OVEN

[75] Inventor: Allan E. Witt, Brown Deer, Wis.

[73] Assignee: Hatco Corporation, Milwaukee, Wis.

[21] Appl. No.: 899,256

[22] Filed: Jul. 23, 1997

[51] Int. Cl.[6] .................................................. H05B 1/02
[52] U.S. Cl. .................... 219/388; 219/413; 219/497; 219/509; 99/329 RT; 99/386
[58] Field of Search ............................ 219/388, 410–413, 219/483–486, 501, 497, 508, 509; 99/329 RT, 386, 443 C

[56] References Cited

U.S. PATENT DOCUMENTS

| | | |
|---|---|---|
| 3,338,680 | 8/1967 | Martens . |
| 3,400,651 | 9/1968 | Hatch . |
| 3,609,491 | 9/1971 | Swanke et al. ........................ 318/252 |
| 3,885,204 | 5/1975 | Abels et al. ............................ 318/139 |
| 3,906,328 | 9/1975 | Wenrich et al. ....................... 318/612 |
| 3,974,353 | 8/1976 | Goltsos . |
| 4,170,932 | 10/1979 | Lalancette . |
| 4,238,995 | 12/1980 | Polster . |
| 4,354,095 | 10/1982 | de Vries . |
| 4,404,898 | 9/1983 | Chaudoir . |
| 4,554,437 | 11/1985 | Wagner et al. . |
| 5,119,719 | 6/1992 | DePasquale . |
| 5,170,215 | 12/1992 | Pfeuffer . |
| 5,179,265 | 1/1993 | Sheridan et al. ...................... 219/497 |
| 5,197,375 | 3/1993 | Rosenbrock et al. . |
| 5,262,618 | 11/1993 | Thelen .................................. 219/486 |
| 5,433,368 | 7/1995 | Spigarelli ................................. 228/8 |

*Primary Examiner*—Mark H. Paschall
*Attorney, Agent, or Firm*—Foley & Lardner

[57] ABSTRACT

A method and apparatus for controlling the speed at which an AC electric motor drives a conveyor to move food products through a conveyor oven are disclosed herein. The oven includes a housing, electric heating elements mounted within the housing, and a conveyor to move food-carrying baskets adjacent the heating elements. A motor controlled by a speed control circuit moves the conveyor. The speed control circuit includes a rectifier to provide rectified current to the motor, a shunt circuit to bypass the rectifier with a rheostat to set the conveyor speed, a thermostat to monitor oven temperature, and a speed-reducing circuit to introduce additional resistance into the shunt circuit when the oven temperature drops. The thermostat also controls additional heating elements to provide additional heat during high load conditions. If an increase in oven load causes a drop in temperature, the additional heating elements are turned on and the conveyor speed is reduced as the additional resistance is introduced into the shunt circuit. The slower speed gives additional heating time at low oven temperatures. The method and apparatus disclosed herein may also be used with conveyor ovens for non-food products.

20 Claims, 4 Drawing Sheets

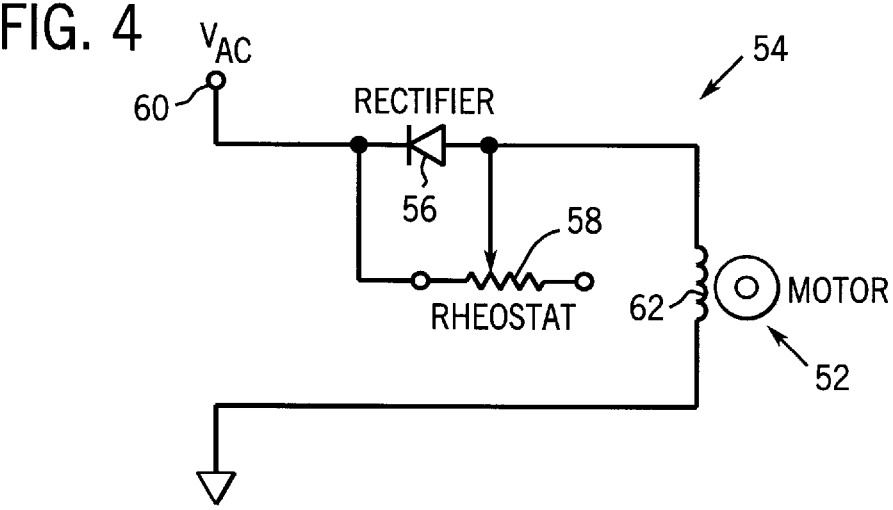
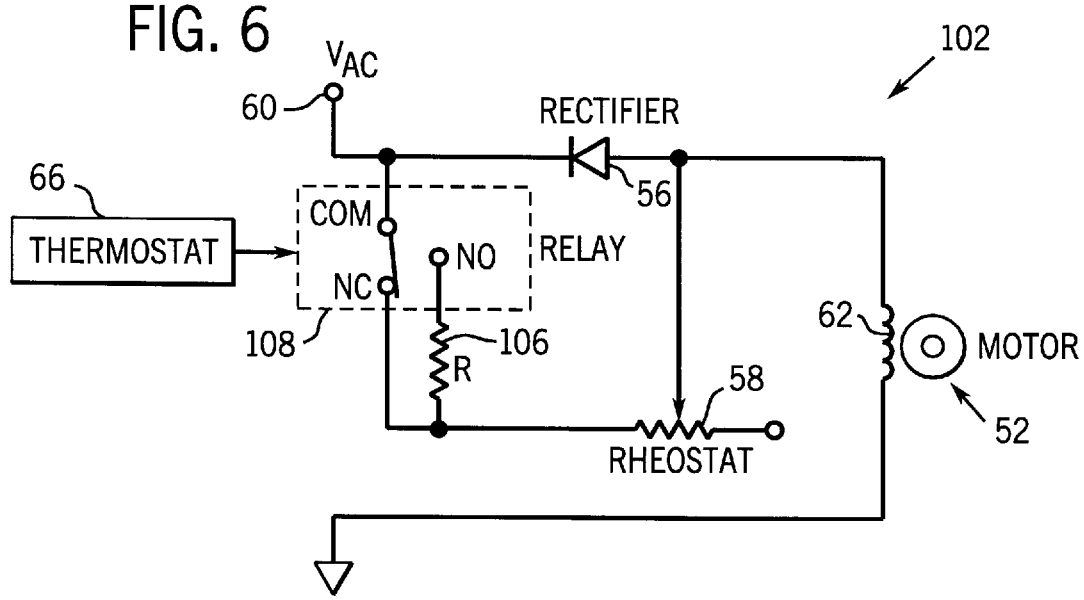

CONVEYOR SPEED CONTROL CIRUIT FOR A CONVEYOR OVEN

FIELD OF THE INVENTION

The present invention relates generally to the field of conveyor ovens and more particularly to conveyor ovens which include a control circuit for controlling the speed at which a conveyor moves food products through the oven.

BACKGROUND OF THE INVENTION

Conveyor ovens typically include an oven housing, a heat source within the housing, and a conveyor configured to move food products through the oven, whereby the food products are heated or toasted by the heat source. The use of an endless conveyor to move food products through the oven typically increases the processing capacity of conveyor ovens over other types of ovens. The degree to which food products are heated depends on the temperature within the conveyor oven and the time period during which food products are heated (which is a function of conveyor speed). Thus, to control the degree of heating, conveyor ovens typically provide operator controls configured to adjust the oven temperature or conveyor speed.

Different types of conveyor ovens are known. For example, conveyor toasters are commonly used to toast food products including bread, buns, bagels, muffins and waffles. A full line of electric conveyor toasters is made, for example, by Hatco Corporation of Wisconsin. These conveyor toasters, which include both vertical and horizontal models, include a toaster housing, electric heating elements mounted within the toaster housing, and an endless conveyor which moves food products adjacent to the heating elements such that the food products are toasted. The food products can be placed directly on the conveyor of a horizontal toaster oven, or can be held within a food-carrying basket of either a vertical or horizontal toaster oven. Food products are manually loaded through an opening in the housing, are toasted as they are moved past the heating elements by the endless conveyor, and are discharged into a product receiving tray located at the bottom of the housing.

Other types of conveyor ovens for processing food products include, for example, conveyorized pizza ovens, microwave ovens and tunnel ovens. However, conveyor ovens may also be used to heat products other than food. For example, conveyor ovens may be used to cure rubber sheets or to dry ink on printed materials. Control over the degree of heating in each type of conveyor oven is typically accomplished by varying the oven temperature or the conveyor speed. Although the description below is focused on toaster conveyor ovens, the term "conveyor oven" is intended to include other conveyor oven types.

In some conveyor ovens, conveyor speed is controlled by an operator using a variable-resistance device (e.g., a rheostat). The rheostat forms part of a speed control circuit which controls the speed of an AC electric motor driving the conveyor via gears. The degree of toasting is set by appropriate adjustment of the rheostat. An increase in resistance causes the speed control circuit to decrease the conveyor speed, thereby increasing the degree of toasting. Conversely, a decrease in resistance of the rheostat causes an increase in conveyor speed, thereby decreasing the degree of toasting. The operator adjusts the rheostat setting such that the food product being processed is properly heated or toasted. An example of a toaster conveyor oven having such a speed control circuit is the TK-105E oven made by Hatco Corp.

The temperature at which food products processed by certain conveyor ovens are heated depends on the status of the oven's electric heating elements. For example, in the TK-105E oven made by Hatco Corp., one set of elements is always powered while a second set is switched on and off by a temperature-controlled switch (eg., thermostat). The second set of elements is switched off when the oven temperature exceeds the threshold temperature setting of the thermostat, and is switched on when the temperature drops below the threshold. Thus, the oven temperature is regulated about the threshold setting of the thermostat. The thermostat does not affect the speed of the conveyor.

Despite having control circuits for controlling the conveyor speed and heating elements, such conveyor ovens are unable to control the degree to which food products are heated under certain conditions. For example, assume a speed control circuit is adjusted to properly toast a given load of food products. Then, assume a higher load of food products is introduced. The load increase will cause a drop in temperature, and the thermostat may cause additional heating elements to switch on. After a time, the additional elements will provide additional heat to compensate for the higher load. However, the additional elements may need a significant time period to heat up. For example, metal-sheathed electric heating elements commonly used in such ovens require 3–4 minutes to reach their operating temperatures. During this period, food products being processed will receive an insufficient amount of heat energy and will be undercooked.

Attempted solutions to this problem have been to increase the power of the additional heating elements or to switch on more heating elements using the thermostat. These solutions, however, have several drawbacks. First, the higher power ratings or additional heating elements increases the cost of the ovens. Second, the additional power can result in over-heating or burning the products. Third, the power requirements of the conveyor ovens are increased, thereby increasing operating costs.

Some conveyor ovens are equipped with computerized control circuits (eg., microprocessors; microcontrollers) which control conveyor speed in response to various sensed parameters. However, such control circuits are too expensive for many applications, and the increased complexity will result in a relatively high failure rate.

Accordingly, it would be advantageous to provide an improved speed control circuit for a conveyor oven. It would be advantageous to provide a conveyor speed control circuit which responds to a temperature drop by slowing the conveyor to increase the heating time of the food products being processed. It would also be advantageous to provide a simplified conveyor speed control circuit having decreased complexity, lower costs and increased reliability compared to computerized control circuits.

SUMMARY OF THE INVENTION

One embodiment of the invention relates to a method of controlling the speed at which an AC electric motor drives a conveyor to move products through a conveyor oven. The method includes setting an operator-adjustable circuit element in a speed-control circuit to drive the motor at a desired speed, sensing a temperature within the oven, determining when a change in load has occurred based on a change in sensed temperature, and compensating for the change in load by effectively changing settings of the operator-adjustable element, whereby the conveyor speed is changed to compensate for the change in load.

Another embodiment of the invention relates to a speed control circuit for controlling the speed at which a motor including a field coil drives a conveyor to move products through a conveyor oven. The circuit includes a rectifier to provide a rectified current to the coil, a shunt circuit to introduce a DC voltage into the coil by shunting the rectifier with a variable-resistance device, a temperature-sensor to generate a control signal when a temperature within the oven drops below a threshold, and a speed-reducing circuit responsive to the control signal to introduce additional resistance into the shunt circuit when the oven temperature drops below the threshold.

Another embodiment of the invention relates to a conveyor oven including an oven housing, heating elements mounted within the housing including at least one element turned on and off by a control signal, a conveyor to move products through the housing adjacent the elements, an AC electric motor to move the conveyor at different speeds in response to the control signal, a temperature-sensing device to generate a signal based on an oven temperature, and a control circuit to generate the control signal to change conveyor speed and to turn on and off the at least one heating element when the oven temperature drops below and rises above a predetermined value, respectively.

BRIEF DESCRIPTION OF THE DRAWINGS

The invention will become more fully understood from the following detailed description, taken in conjunction with the accompanying drawings, wherein like reference numerals refer to like parts, in which:

FIG. 4 is a simplified schematic diagram showing the conveyor speed control circuit of FIG. 3;

FIG. 6 is a simplified schematic diagram showing the conveyor speed control circuit of FIG. 5.

DETAILED DESCRIPTION OF THE PREFERRED EMBODIMENTS

Figure 1:
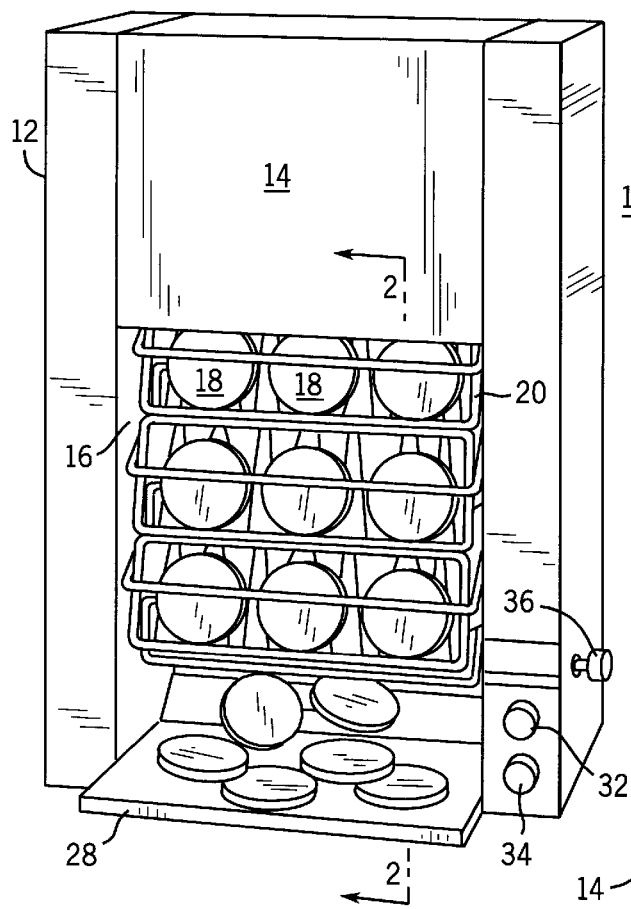
FIG. 1 is a perspective view of a conveyor oven of the present invention including a toaster housing and a conveyor which moves food-carrying baskets adjacent to heating elements mounted within the toaster housing.
Figure 2:
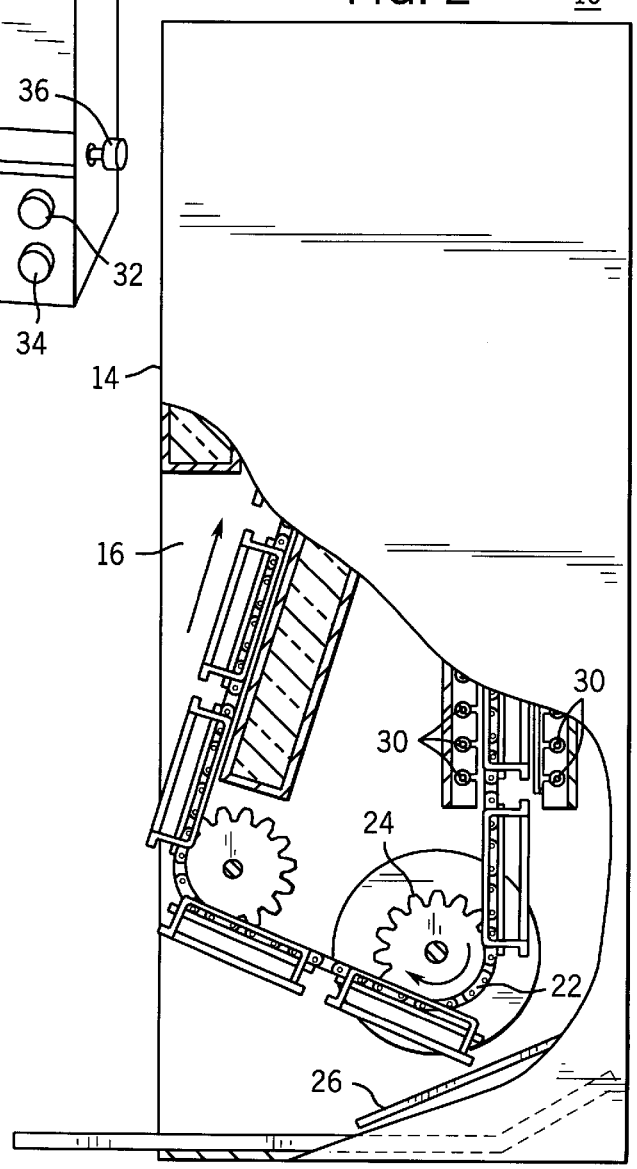
FIG. 2 is a side view of the oven shown in FIG. 1.

Referring to FIGS. 1 and 2, a toaster conveyor oven 10 includes an oven housing 12 having an insulated front wall 14 with an aperture 16 through which food products 18 are inserted into food-carrying baskets 20. The top, sides and back of housing 12 are insulated. Baskets 20 are coupled to a pair of endless chains 22 which move the baskets into a toasting zone within oven 10. Chains 22 are supported by rotatable sprockets 24 driven by an AC electric motor 52 (see FIGS. 3–6) via a drive shaft (not shown). A clutch and gear assembly (not shown) may be provided between motor 52 and sprockets 24 to drive the conveyor in the clockwise direction in FIG. 2. Baskets 20 include an open-wire framework configured to retain the products in place while being moved through oven 10.

In operation, food products 18 are inserted through aperture 16 for retention within baskets 20. The baskets 20 are moved by the conveyor through the toasting zone of oven 10. Products reaching the bottom of the conveyor fall from baskets 20 onto a slanted wall 26, wherein they are guided into a receiving tray 28 for removal.

Electric heating elements 30 are mounted within housing 12 adjacent to chains 22 such that food products 18 retained within baskets 20 are exposed to radiant heat emitted by elements 30. The configuration of elements 30 depends on the application. Elements 30 may be metal-sheathed electric heating elements, although other types of heating elements (e.g., radiant heaters) may be used. Elements 30 typically require a significant time period to reach their operating temperatures after turn on.

The degree to which food products 18 are toasted by oven 10 depends upon the speed of the conveyor, and upon which elements 30 are turned on and their power ratings. The user can adjust conveyor speed using a speed control knob 32. The on/off and power rating configuration of elements 30 are selected for a particular oven. In some ovens, different configurations are selected by the user depending on food products 18 being heated. For example, selector switch 34 includes TOAST, OFF and BUNS positions wherein a first set of elements 30 for toasting bread is turned on when switch 34 is in TOAST position, oven 10 is off when switch 34 is in OFF position, and a second set of elements 30 for toasting buns is on when switch 34 is in BUNS position. The conveyor speed and on/off settings of elements 30 are controlled as described below. Oven 10 may also be equipped with a manual advance knob 36 to manually advance the conveyor.

The conveyor oven described herein is similar to the TK-100 and TK-105E toaster conveyor ovens made by Hatco Corp. of Wis., except for the control circuits described below. These control circuits can also be used in other conveyor ovens made by Hatco and by other suppliers, and can be used in conveyor ovens which heat other types of food (e.g., conveyorized pizza ovens) or heat non-food products (e.g., ovens for curing rubber or drying ink).

Figure 3:
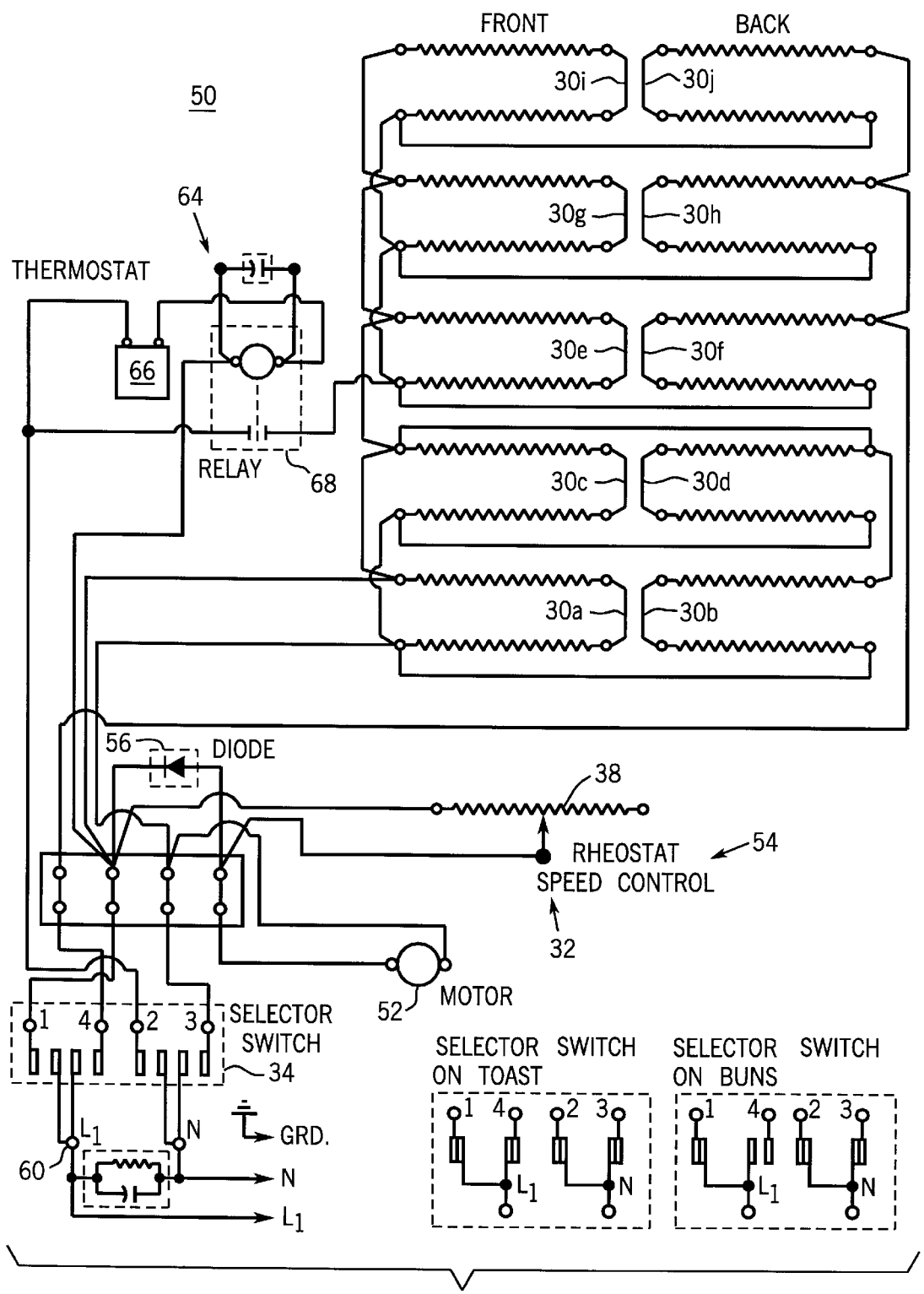
FIG. 3 is a schematic diagram showing the control circuits for the electrical heating elements and conveyor motor of an existing conveyor oven.

Referring to FIG. 3, in an existing conveyor oven, the conveyor speed is controlled by a control circuit 50. The conveyor speed depends on the speed at which motor 52 drives the conveyor. Motor 52 is driven by speed control circuit 54 which includes a rectifier 56 and a variable-resistance device 58 (e.g., a rheostat), as shown clearly in FIG. 4. Rectifier 56 has a cathode connected to an AC power source 60 (line voltage $L_1$) and an anode connected to a field coil 62 of motor 52. Rheostat 58 has a first terminal connected to the cathode of rectifier 56, an unconnected second terminal, and a wiper connected to the rectifier's anode. Thus, rheostat 58 shunts rectifier 56 with a resistance varied using speed control knob 32.

Rectifier 56 provides a rectified current to coil 62 such that motor 52 moves the conveyor. The shunt circuit including rheostat 58 shunts rectifier 56 with a variable resistance set by the user to impose an artificial load on motor 52 and depress its speed-torque characteristic. A DC voltage depending upon the setting of rheostat 58 is thus introduced into coil 62. Increasing the resistance of rheostat 58 bypasses less current around rectifier 56, increases the proportion of rectified current and creates an increased direct current drag to cause the speed of motor 52 and the conveyor to decrease. Decreasing the resistance has the opposite effects.

Oven 10 includes two sets of heating elements 30. The first set of elements 30, designated 30a–30d, remain on whenever oven 10 is operated. The second set (30e–30j) may turn on only if the temperature within oven 10 falls below a predetermined value. The second set of elements is controlled by a heating control circuit 64 including a temperature-sensing device 66 (e.g., a thermostat) and a switching device 68 (e.g., a relay) which selectively turn on the second set of elements 30 based upon a signal generated by thermostat 66. Elements 30*e*–30*j* are off if the temperature is above the threshold of thermostat 66. However, if oven temperature falls below the threshold, elements 30*e*–30*j* are turned on if selector switch 34 is selecting TOAST and elements 30*e*, 30*g* and 30*i* are turned on if switch 34 selects BUNS. For example, elements 30*a*–30*b* and 30*e*–30*f* are rated at 330 W and elements 30*c*–30*d* and 30*g*–30*j* rated at 250 W. Thermostat 66 presents an open circuit at high temperatures and a closed circuit at low temperatures. There is no interaction between speed control circuit 54 and heating control circuit 64.

In operation, the operator adjusts the setting of rheostat 58 to drive motor 52 at a speed corresponding to a conveyor speed at which food products 18 are adequately toasted. A problem can arise, however, if the load of products 18 is then increased. Assume, for example, that the conveyor speed is adjusted while a given load of food products 18 is being heated. The load is then increased by adding products to baskets 20. The increase in load will cause the temperature in oven 10 to drop. If the temperature decreases below the setting of thermostat 66, the decrease will be detected as thermostat 66 becomes a closed circuit and connects the neutral terminals of the second set of elements 30 to the neutral supply voltage via relay 68 to turn on these elements. The temperature decrease due to increased food load is thus accommodated. If the temperature rises above the threshold, thermostat 66 will conversely turn off the second set of elements.

The problem occurs because heating elements 30 need a significant time to reach their operating temperatures. Metal-sheathed heating elements may require 3–4 minutes to heat up and radiant heaters also require a significant time. Between the time that a low-temperature condition caused by increased load is detected by thermostat 66 and the time that the second set of elements 30 reaches their operating temperature, the food products being processed may be undercooked since the oven temperature is too low.

Figure 5:
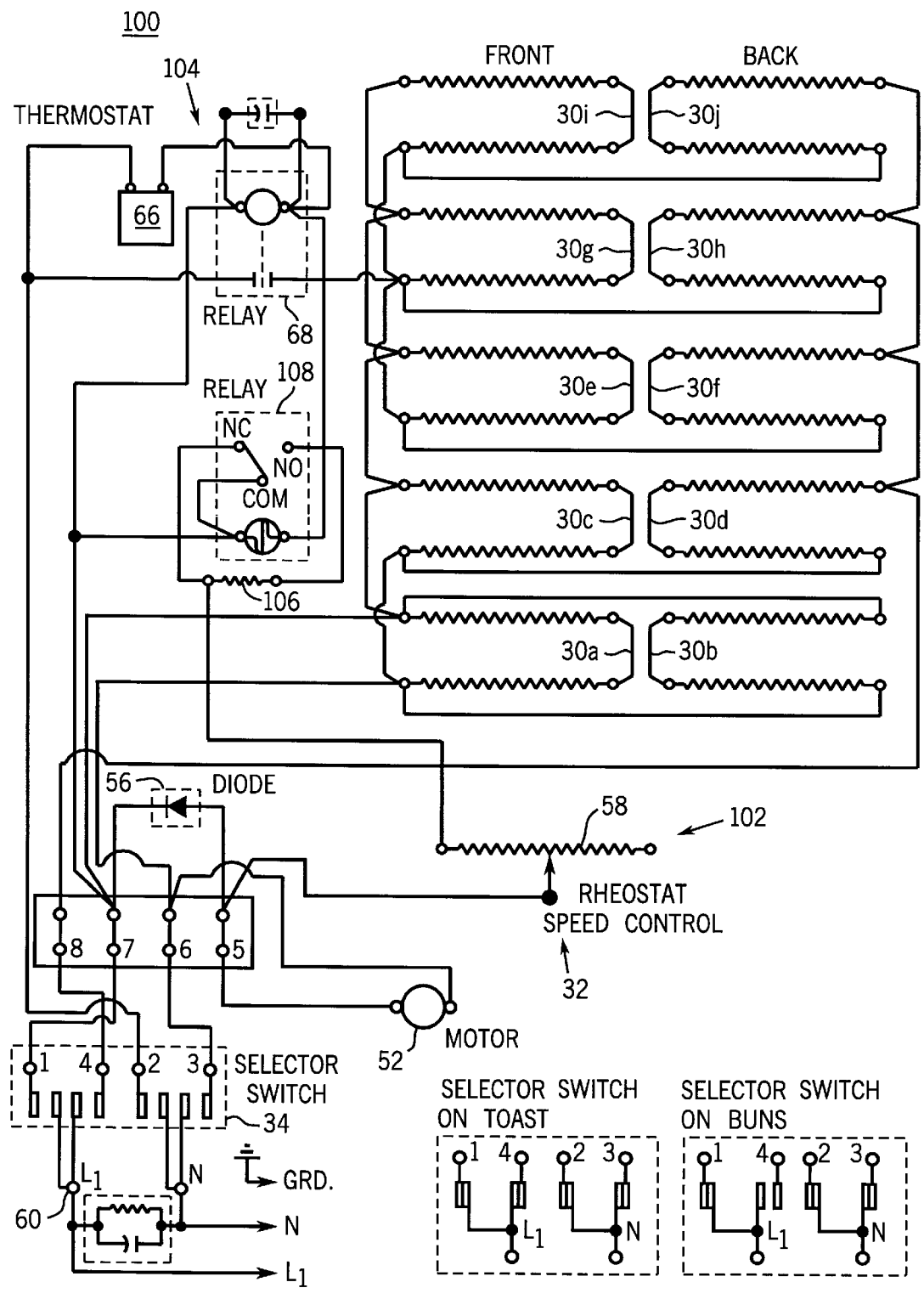
FIG. 5 is a schematic diagram showing the control circuits for the electrical heating elements and conveyor motor of an improved conveyor oven.

Referring to FIG. 5, a control circuit 100 for a conveyor oven such as oven 10 which solves the above-described problem is shown. Control circuit 100 includes a speed control circuit 102 and a heating control circuit 104. However, contrary to speed control circuit 54 and heating control circuit 64 of control circuit 50, there is an interaction between speed control circuit 102 and heating control circuit 104 since each depends upon a temperature control signal generated by thermostat 66.

Speed control circuit 102 includes rectifier 56, rheostat 58, an additional resistor 106, a switching device 108 (e.g., a relay) and thermostat 66 (FIG. 6). Relay 108 includes common (COM), normally-closed (NC) and normally-open (NO) terminals. The COM terminal connects to the cathode of rectifier 56, the NC terminal connects to the first terminal of rheostat 58, and the NO terminal connects to a first terminal of resistor 106. A second terminal of resistor 106 connects to the first terminal of rheostat 58. The control signal for relay 108 is the temperature signal generated by thermostat 66. The cathode of rectifier 56 is connected to AC voltage source 60 and the anode to field coil 62 of electric motor 52.

When the temperature in conveyor oven 10 is above the threshold temperature of thermostat 66, relay 108 connects its COM terminal to its NC terminal. In this state, the cathode of rectifier 56 is connected to the first terminal of rheostat 58 and resistor 106 does not affect the circuit. Thus, speed control circuit 102 in this state operates like speed control circuit 54.

When the temperature drops below the threshold of thermostat 66, however, the COM and NO terminals of relay 108 are connected. In this state, the first terminal of resistor 106 is connected to the cathode of rectifier 56 so that resistor 106 is in series with rheostat 58. The setting of rheostat 58 is, thus, effectively changed by the additional resistance of resistor 106. Rectifier 56 is now shunted by an additional resistance, introducing a higher DC voltage into coil 62 and decreasing the speed of motor 52 and the conveyor. When the temperature rises above the threshold, relay 108 reconnects its COM and NC terminals and the conveyor returns to its original speed. Thus, a decrease in oven temperature below the threshold of thermostat 66 causes a drop in conveyor speed until the temperature returns above the threshold temperature.

Heating elements 30 are also configured in sets in FIG. 5. The first set of elements 30 (30*a*–30*d* if switch 34 selects TOAST and 30*a*–30*c* if switch 34 selects BUNS) remain on whenever oven 10 is operated. The second set of elements 30 (30*e*–30*j* when switch 34 selects TOAST and 30*e*, 30*g* and 30*i* when switch 34 selects BUNS) are turned on only when the temperature within oven 10 is below the threshold of thermostat 66. The on/off status of the second set is controlled by heating control circuit 104 which includes thermostat 66 and relay 68. Thus, the second set of elements 30 is controlled by thermostat 66.

In operation, the operator adjusts the setting of rheostat 58 to drive motor 52 at a speed corresponding to a conveyor speed at which food products 18 are adequately toasted. Control circuit 100 accommodates an increase in oven load by turning on the second set of elements 30 and by reducing conveyor speed to provide additional heating time while the second set of elements heat up. After the temperature rises back above the threshold temperature of thermostat 66, the second set of elements 30 are turned off and conveyor speed is returned to the original speed. Thus, the above-described problem wherein food products are inadequately heated during the time required for the additional heating elements to heat up is avoided.

In the embodiment of FIG. 5, elements 30*a*, 30*b*, 30*i* and 30*j* are 470 W elements, elements 30*c*–30*f* are 330 W and elements 30*g* and 30*h* are 250 W. Rheostat 58 is 250 ohms and resistor 106 is 110 ohms. Thermostat 66 is a P/N 351-328-90 mechanical thermostat made by Columbus Electric with a threshold temperature of 600° F. and a hysteresis band of several degrees. Alternatively, an electronic thermostat may be used to allow a broader temperature range (e.g., up to approximately 800° F.). Relay 108 may be a P/N 23-141-70 relay made by Deltrol.

While the embodiments illustrated in the FIGs. and described above are presently preferred, it should be understood that these embodiments are offered by way of example only. For example, although a conveyor oven for heating food products is described in detail herein, the disclosed circuit may control the speed of conveyor ovens used to heat non-food products. The on/off and power rating configuration of elements 30 can be changed for other oven applications. Component values stated above are for illustration only. Also, the disclosed circuit can be used on vertical and horizontal conveyor ovens. The invention is not limited to a particular embodiment, but extends to various modifications that nevertheless fall within the scope of the appended claims.

What is claimed is:

1. A method of controlling the speed at which an AC electric motor drives a conveyor to move products through a conveyor oven, comprising the steps of:

setting an operator-adjustable circuit element in a speed-control circuit to drive the AC motor at a desired speed, whereby the speed of the conveyor is set for a given load of products;

sensing a temperature within the conveyor oven;

determining when a change in load of products has occurred based on a change in the sensed temperature; and compensating for the change in load by electrically coupling a second circuit element into the speed-control circuit, effectively changing the setting of the operator-adjustable element, whereby the speed of the conveyor is changed to compensate for the change in load.

2. The method of claim 1 wherein the speed-control circuit includes a rectifier coupled in series between an AC power source and a field coil of the electric motor.

3. The method of claim 2 wherein the operator-adjustable circuit element includes a variable-resistance device shunting the rectifier, thereby introducing a variable DC voltage into the field coil which depends on the setting of the variable-resistance device.

4. The method of claim 3 wherein the variable-resistance device includes a rheostat.

5. The method of claim 3 wherein, when the sensed temperature drops below a predetermined value, the setting of the variable-resistance device is effectively changed by introducing an additional resistance in series with the variable-resistance device, thereby decreasing the speed of the conveyor.

6. The method of claim 5 wherein, when the sensed temperature rises above the predetermined value, the setting of the variable-resistance device is effectively changed by removing the additional resistance from being in series with the variable-resistance device, thereby increasing the speed of the conveyor.

7. A speed control circuit for controlling the speed at which an AC electric motor including a field coil drives a conveyor to move products through a conveyor oven, comprising:

a rectifier coupled in series between an AC power source and the coil to provide a rectified current to the coil;

a shunt circuit configured to introduce a DC voltage into the coil by shunting the rectifier with a variable-resistance device, the speed of the conveyor depending upon the resistance of the variable-resistance device;

a temperature-sensing device configured to generate a control signal when a temperature within the conveyor oven drops below a predetermined value; and a speed-reducing circuit responsive to the control signal to introduce an additional resistance into the shunt circuit when the temperature at the point within the conveyor oven drops below the predetermined value, thereby decreasing the speed of the conveyor.

8. The speed control circuit of claim 7 wherein the rectifier has a first terminal connected to the AC power source and a second terminal connected to the coil, and the variable-resistance device has a first terminal coupled to the first terminal of the rectifier and a wiper connected to the second terminal of the rectifier.

9. The speed control circuit of claim 8 wherein the additional resistance is introduced by selectively connecting a resistor between the first terminal of the rectifier and first terminal of the variable-resistance device based upon the temperature within the conveyor.

10. The speed control circuit of claim 9 wherein the speed-reducing circuit includes a switching device having a common terminal connected to the first terminal of the rectifier, a first terminal connected to the first terminal of the variable-resistance device, and a second terminal connected to a first terminal of the resistor, the resistor further having a second terminal connected to the first terminal of the variable-resistance device.

11. The speed control circuit of claim 10 wherein the variable-resistance device includes a rheostat.

12. The speed control circuit of claim 7 wherein the speed-reducing circuit is further responsive to the control signal to remove the additional resistance from the shunt circuit when the temperature rises above the predetermined value, thereby increasing the speed of the conveyor.

13. A conveyor oven, comprising:

an oven housing;

a plurality of heating elements mounted within the oven housing, wherein at least one heating element is turned on and off in response to a temperature within the oven housing;

a conveyor configured to move products through the oven housing adjacent the heating elements, whereby the products are exposed to the plurality of heating elements;

an AC electric motor mechanically coupled to the conveyor to move the conveyor at different speeds in response to the temperature within the oven housing;

a temperature-sensing device configured to generate a temperature signal based upon the temperature within the oven housing; and a control circuit coupled to the at least one heating element, the motor, and the temperature-sensing device, wherein the control circuit is configured to step down and step up the speed of the conveyor and to turn on and off the at least one heating element when the sensed temperature drops below and rises above a predetermined value, respectively.

14. The conveyor oven of claim 13 wherein the heating elements are metal-sheathed electric elements.

15. The conveyor oven of claim 13 wherein the control circuit includes a rectifier coupled in series between an AC power source and the motor.

16. The conveyor oven of claim 15 wherein the control circuit further includes a shunt circuit to bypass the rectifier.

17. The conveyor oven of claim 16 wherein the shunt circuit includes a variable-resistance device to bypass a variable amount of current around the rectifier.

18. The conveyor oven of claim 17 wherein the variable-resistance device is set to move the conveyor at a desired speed for a given load of products.

19. The conveyor oven of claim 18 wherein the control circuit includes a speed-reducing circuit which introduces an additional resistance into the shunt circuit when the temperature within the conveyor oven drops below the predetermined value.

20. The conveyor oven of claim 19 wherein the speed-reducing circuit removes the additional resistance from the shunt circuit when the temperature within the conveyor oven rises above the predetermined value.

* * * * *